2,959,621

PROCESS FOR THE PREPARATION OF ALKYLPHOSPHINES

Heinz Niebergall and Bruno Langenfeld, Frankfurt am Main, Germany, assignors to Koppers Company, Inc., a corporation of Delaware No Drawing. Filed Dec. 9, 1958, Ser. No. 779,045

17 Claims. (Cl. 260—606.5)

This invention relates to the preparation of organophosphines from diorganohalophosphines. In one specific aspect, it relates to a one-step process for the preparation of dialkylphosphines from the readily available dialkylhalophosphines. In another aspect, it relates to the preparation of tetraalkyldiphosphines from dialkylhalophosphines and the cleavage of the P—P bond of the tetraalkyldiphosphines using an alkali metal to form dialkylphosphine metal compounds.

There are several methods for making organophosphorus compounds reported in the literature. The reaction of alkyl halides with phosphonium iodide and zinc oxide in a bomb tube at 100–180° C. is known. The yields of this process are not good and the desired products are impure. The addition of alkyl iodides to yellow phosphorus and caustic soda solution leads to similar impure mixtures and poor yields, of an order of magnitude below 20%. Dialkylphosphines are obtained along with other phosphines by the reaction of $P_4S_3$ with alkyl magnesium bromide. The yield of dialkylphosphine by this method is below 20%. The preparation of phosphines from the sodium or potassium salt of the phosphine, using alkyl halides, is also known. The yields of this process are below 50%. A process described recently in the literature involves the preparation of dimethylphosphine by reacting hydrogen phosphide with methylchloride and sodium in liquid ammonia at a temperature of −78° C. This process requires expensive apparatus and it is difficult to recover the desired product from the numerous side products formed during the reaction. The yield of dimethylphosphine by this method averages about 50%. Kuchen and Buchwald, Angewandte Chemie, 69 (1957), pages 307–8 disclose a process for making diphenylphosphines from diphenylchlorophosphines in dibutyl ether. Unfortunately, this process is not suitable for preparing the dialkylphosphines from the dialkylhalophosphines because of the difficulty involved in cleaving the P—P bond of the intermediate tetraalkyldiphosphine, as shown in the comparative examples that follow.

Quite surprisingly, we have discovered a novel one-step process for making, in high yield, dialkylphosphines from dialkylhalophosphines. We have also found that our novel process can be conducted stepwise to obtain the valuable tetraalkyldiphosphines and metal salts of dialkylphosphines as products of the intermediate reactions.

It is, therefore, an object of the present invention to provide a one-step method for making dialkylphosphines in yields of about 90% or higher.

It is a further object of the invention to provide a new and efficient method for preparing tetraalkyldiphosphines and a novel method for converting the tetraalkyldiphosphines to dialkylphosphines.

In accordance with the one-step process of the invention, the dialkylhalophosphine is contacted at an elevated temperature with an alkali metal in an aromatic hydrocarbon solvent, preferably under an inert atmosphere. The reaction mixture is held under these conditions for a period of time and a quantity of a lower aliphatic alcohol, water or an organic acid is added thereto to liberate the dialkylphosphine, which is recovered by distillation.

The reaction proceeds stepwise according to the following equations:

(1) $2\ R_2PX + 2\ M \rightarrow R_2P\text{—}PR_2 + 2\ MX$
(2) $R_2P\text{—}PR_2 + 2\ M \rightarrow 2\ R_2PM$
(3) $2\ R_2PM + 2\ R'OH \rightarrow 2\ R_2PH + 2\ R'OM$
   (or $2\ R'COOH$)

In the above equations R and R′ are lower alkyl radicals, including lower cycloalkyl, M is an alkali metal, and X is a halogen.

The choice of a solvent for our novel one-step reaction is of particular importance. We have found that only by using aromatic hydrocarbon solvents are we able to obtain the one-step conversion of dialkylhalophosphine to dialkylphosphine. Oxygenated solvents, such as dibutyl ether, are unsuitable for the one-step process as shown by the data presented in Example 7, infra. From Example 7 it is seen that if the reaction is conducted in the presence of dibutyl ether, it results in the formation of a low yield of dialkylphosphine in the form of an azeotropic mixture with the ether. From an economic standpoint it is impossible to resolve this azeotrope and recover the desired product. The aromatic hydrocarbon solvents useful for purposes of the invention include, but are not limited to, tetralin, benzene, toluene, xylene, Decalin, cumene, cymene, durene, alkylnaphthalenes, alkylbiphenyls, and the like. It is believed that the aromatic hydrocarbon has a catalytic effect on the cleaving of the P—P bond of the tetraalkyldiphosphine, thus permitting the cleavage to occur at much lower temperatures.

Reaction temperatures suitable for the present invention vary widely. The lower limit of the reaction is a practical rather than a theoretical one, since it is desirable to use a reaction temperature which will lead to the formation of the dialkylphosphine within a minimum period of time. We have noted that a strong exothermic reaction begins at a temperature of about 60° C. The upper temperature limit is determined by the decomposition temperature of the reactants and products and the boiling point of the particular solvent selected. This temperature is generally in the neighborhood of about 210° C. A preferred temperature range for the one-step process is between 100 and 140° C.

The mole ratio of the reactants used is not critical. In order to obtain complete conversion of the dialkylhalophosphine to the dialkylphosphine, it is necessary to use at least two moles of alkali metal for each mole of dialkylhalophosphine, as shown by Equations 1–3, supra. The reactants may be admixed by adding one or the other dropwise as the reaction temperature is increased or they may be mixed together and slowly heated. It is desirable, although not essential, to conduct the reaction in the presence of an inert atmosphere to protect the reaction products from oxidation.

We have found that it is necessary to use an alkali metal to effect cleavage of the intermediate tetraalkyldiphosphine. Potassium, because of its reactivity, is preferred, although sodium, lithium, and other alkali metals work well in the process. The presence of a small amount of potassium, e.g. from 1 to 5% of the total quantity of metal, helps to initiate the reaction when other alkali metals are used.

We have already noted that the reaction can be conducted stepwise and stopped at any given point to recover the intermediate products. The conditions required for the preparation of the tetraalkyldiphosphines are not as rigid as those necessary for the one-step preparation of the dialkylphosphines. The metal used to make the tetraalkyldiphosphine may be less reactive; hence it is possible to use calcium, magnesium, zinc, aluminum, iron, copper, and lead in addition to the alkali metals suitable for the one-step process. Moreover, the tetraalkyldiphosphines may be prepared in oxygenated solvents in addition to the aromatic hydrocarbon solvents mentioned hereabove. Suitable oxygenated solvents include diethyl ether, diisopropyl ether, dibutyl ether, diamyl ether, dioxane, tetrahydrofuran, diethyleneglycol dimethyl ether (diglyme), and the like. The tetraalkyldiphosphines do not form azeotropes with ethers as do the dialkylphosphines; hence it is possible to recover them conveniently from oxygenated solvents. For over-all ease of operation and to permit the continuation of the reaction, if desired, to form the dialkylphosphines, the aromatic hydrocarbon solvents are preferred. The reaction temperature for preparing the tetraalkyldiphosphines varies within the same limits as those described hereabove for the one-step process, although it is possible, and therefore preferred, to use the more moderate temperature conditions in the lower portion of the range. It will be noted from Equation 1 that, in order to prepare the tetraalkyldiphosphines, only 1 mole of metal should be used for each mole of dialkylhalophosphine.

The dialkylphosphine metal compounds are obtained in pure form with yields generally of about 95% directly from the tetraorganodiphosphines and metal as shown in Equation 2. For purposes of this reaction it is necessary to use an aromatic solvent of the class described above and an alkali metal to effect cleavage of the P—P bond of the tetraalkyldiphosphine. The temperature of the reaction is the same as that described hereabove. It is apparent from Equation 2 that at least 2 moles of alkali metal are required for each mole of tetraalkyldiphosphine.

The dialkylphosphine is liberated from the dialkylphosphine metal compound by the reaction with a proton donor, such as a lower aliphatic alcohol, i.e. one having not more than 6 carbon atoms, water, or organic acids, as shown in Equation 3. Water and alcohols are the preferred proton donors.

The tetraalkyldiphosphines and the dialkylphosphines are strong reducing agents. They are, because of their strong odor and reactivity, very effective as warning chemicals when added to other gases in small amounts, e.g. 0.5–1% by volume. Additional uses for the dialkylphosphines and the dialkylphosphine metal compounds are given in U.S. Patents 2,437,796 and 2,437,797.

Our invention is further illustrated by the following examples.

*Example I*

One hundred fifty ml. Decalin were introduced in a 250 ml. round-bottom flask provided with stirrer, dropping funnel, and an ascending tube 20 cm. long, and 30 gr. potassium were added under an atmosphere of nitrogen. The reaction mixture was then heated to 140–150° C. on an oil bath while stirring, and the speed of stirring was regulated so that the potassium was dispersed throughout the solvent. Then 41.5 gr. diethylmonochlorophosphine were slowly dropped in (within about ½ hour) and the temperature of the oil bath was maintained at about 140° C. After the addition, the mixture was allowed to react for two hours at 160° C., and then the temperature of the oil bath was briefly (5 minutes) raised to 215° C. The oil bath was removed, and the reaction mixture was allowed to cool while stirring.

Then 27 ml. absolute methanol were allowed to drop in the lukewarm flask as such a rate that no methanol was distilled over by the heating. The mixture was then heated to 80° C. for one-half hour while stirring, whereby the excess potassium was completely dissolved. The previously brownish yellow thick paste became once again thinly liquid and white. It was heated to 170° C. while stirring for about one-half hour; an azeotropic mixture of methanol and diethylphosphine was first obtained at 59° C. and then the heart cut was distilled over at 70–72° C. The temperature was then further increased to the boiling point of the Decalin-oil bath (230° C.) and the remainder of the phosphine was distilled over thereby.

The methanol was removed from the distillate with water (caustic liquor could be used) and the diethylphosphine, dried over KOH, was fractionated by means of a small column. The total amount passed over at about 85–85.5° C.

Yield—27.2 gr.=91% of theory.

Another alcohol with a higher boiling point can be used in place of methanol, whereby the subsequent separation is eliminated. The same can be achieved using one-half or another amount of methanol or the calculated amount of water. Only in this case it must be stirred somewhat longer because of the difficult reaction.

*Example II*

Seventy gr. diethylmonochlorophosphine and 40 ml. dibutyl ether were introduced in a 250 ml. round-bottom flask provided with a stirrer and an ascending tube 20 cm. long. The flask was heated in an oil bath at 100° C. Then 14.5 gr. sodium in pea size pieces were added through the ascending tube in the course of two hours. The mixture was allowed to react for one hour at 110–120° C. and then all volatile constituents were distilled off in a vacuum at 4 mm. Hg until the residue of sodium chloride was completely dried (temperature of the oil bath—138° C.). The distillate was then fractionated by means of a small column and 45.5 gr. tetraethyldiphosphine distilled over at 224–226° C., after the forerunnings of dibutyl ether.

Yield—91% of theory.

The diphosphine is a strong smelling, colorless liquid which immediately ignites on contact with air and burns with a luminous, sooty flame.

A monochloride not entirely free from ethyl dichlorophosphine was intentionally used in this experiment in order to show that a high yield is also obtained therewith.

*Example III*

Four gr. potassium were dispersed at 120° C. in 25 ml. decalin in a 100 ml. round-bottom flask, provided with a stirrer, an ascending tube 20 cm. long, and a dropping funnel, under an atmosphere of nitrogen and while stirring, 9 gr. tetraethyldisphosphine were slowly dropped in and allowed to react for 30 minutes at 150° C. After cooling, the potassium salt was decomposed using 15 ml. absolute methanol and the diethylphosphine was isolated as described in Example I.

Yield—8.4 gr.=92% of theory.

*Example IV*

3.9 gr. clean potassium were distributed in 25 ml. Decalin in a 100 ml. round-bottom flask described hereabove under an atmosphere of nitrogen and while stirring. 9.1 gr. tetraethyldiphosphine were slowly dropped in and allowed to react at 150° C. until all the potassium was changed to a yellow powder. The Decalin was then distilled off in a vacuum to completely dry the residue, which consisted of 12.8 gr. yellow powder.

Yield—99% of theory of practically pure potassium diethylphosphine. The compound is immediately ignited in air and occasionally burns with slight explosions.

*Example V*

In a 100 ml. round-bottom flask equipped with stirrer, dropping funnel, and reflux condenser, 4 gr. potassium were distributed in 35 ml. xylene at 100° C. (nitrogen atmosphere), and 9 gr. tetraethyldiphosphine were added. Reaction set in instantaneously. After a reaction period of 60 minutes, the reaction mixture was cooled off and decomposed with 10 ml. absolute methanol at about 120° C. All constituents volatile up to 100° C. were separated.

Redistillation gave a yield of 8.2 gr. of diethylphosphine=90% of the theory.

Example VI

In a 100 ml. round-bottom flask equipped with stirrer, dropping funnel, and reflux condenser, 6.1 gr. tetramethyldiphosphine were added to 2.3 gr. Na distributed at 100° C. in 35 ml. Decalin (nitrogen atmosphere). At 132° C. a faint, greenish fluorescence was observed, and the reaction set in. The reaction mixture turned markedly brown at 140° C.

After a reaction period of 90 minutes at 140° C., the product, upon cooling, was decomposed with 8 ml. methanol, and all portions volatile below 70° C. were distilled off. Methanol was separated with solid potassium hydroxide, and pure phosphine was subsequently obtained by distillation in a water bath of 50° C.

Yield—5.5 gr. of dimethylphosphine (B.P. 24° C.) = 88% of the theory.

Example VII

In a 100 ml. round-bottom flask equipped with stirrer, dropping funnel, and reflux condenser, 12.4 gr. diethylmonochlorophosphine were slowly added to 7.8 gr. potassium distributed in form of small globules in 35 ml. dibutyl ether at a temperature of 65° C. (nitrogen atmosphere). The first few drops which were added showed a particularly violent reaction. Temperature was kept for one hour at 135° C. After this period of time, a light blue salt pulp had formed which was interfused with unconverted potassium. To decompose the potassium-salt, 8 ml. of absolute methanol were added dropwise to the reaction solution, which had a temperature of about 50° C., and a mixture of diethylphosphine, dibutyl ether, and methanol was distilled off with stirring and heating to the boiling point of the dibutyl ether. Redistillation of the fraction which distilled over between 71° and 130° C. gave 3.3 gr. of an azeotropic mixture containing about 22 percent dibutyl ether, which corresponds to 2.5 gr. $Et_2PH$=23 percent of the theory. The azeotropic mixture could not be conveniently resolved.

Example VIII

In a 100 ml. round-bottom flask equipped with stirrer, dropping funnel, and reflux condenser, 4 gr. potassium were distributed with stirring in 35 ml. dibutyl ether at 65° C., and 9 gr. tetraethyldiphosphine were added (nitrogen atmosphere). With continued stirring, the reaction mixture was kept for 60 minutes at 140° C. After cooling off to about 50° C., it was decomposed with 6 ml. of absolute methanol, and the resultant diethylphosphine distilled off via a descending Liebig condenser by slowly heating to the boiling point of the dibutyl ether. After a few drops had distilled over between 61° and 75° C., the temperature rapidly increased to 110° C. No uniform substance could be isolated from the mixture.

We have thus provided a simple, direct, one-step process for preparing dialkylphosphines in high yield. Our process is relatively free of objectionable side reactions; hence the difficult separation problems which were present in the prior art processes have been eliminated. We have also provided an efficient method for making the valuable tetraalkyldiphosphines in high yield and a method for cleaving the P—P bond of these compounds to prepare the valuable dialkylphosphine metal compounds.

We claim:

1. Method of making dialkylphosphines comprising reacting at an elevated temperature a dialkylhalophosphine with an alkali metal in an aromatic hydrocarbon solvent to form a dialkylphosphine metal compound, reacting said metal compound with a proton donor selected from the group consisting of lower aliphatic alcohols, organic acids and water, and recovering a dialkylphosphine from the reaction mixture.

2. Method of making dialkylphosphines comprising reacting, at a temperature between about 60° and 210° C., a dialkylhalophosphine with an alkali metal in an aromatic hydrocarbon solvent to form a dialkylphosphine metal compound, at least 2 moles of alkali metal being present for each mole of dialkylhalophosphine, reacting said metal compound with a compound having the formula R′OH, wherein R′ is lower alkyl, and recovering a dialkylphosphine from the reaction mixture.

3. Method according to claim 2 wherein said solvent is Decalin and said metal is potassium.

4. Method of making di-lower alkylphosphines comprising reacting, at a temperature between about 60° and 210° C., a di-lower alkylhalophosphine with an alkali metal in an aromatic hydrocarbon solvent to form a di-lower alkylphosphine metal compound reacting said metal compound with a proton donor selected from the group consisting of lower aliphatic alcohols, organic acids and water, and recovering a di-lower alkylphosphine from the reaction mixture by distillation.

5. Method of making di-lower alkylphosphines comprising reacting at a temperature of about 100–140° C. a di-lower alkylhalophosphine with an alkali metal in an aromatic hydrocarbon solvent under an inert atmosphere to form a di-lower alkylphosphine metal compound, at least 2 moles of alkali metal being present for each mole of di-lower alkylhalophosphine, reacting said metal compound with a compound having the formula R′OH, wherein R′ is lower alkyl, and recovering a di-lower alkylphosphine from the reaction mixture by distillation.

6. Method according to claim 5 wherein said solvent is Decalin.

7. Method according to claim 5 wherein said alkali metal is potassium.

8. Method of making tetraalkyldiphosphines comprising reacting at an elevated temperature a dialkylhalophosphine with a metal selected from the group consisting of alkaline metals, Cu, Fe, Zn, Al, Mg, and Pb in a solvent selected from the group consisting of aromatic hydrocarbons and oxygenated organic solvents, and recovering a tetraalkyldiphosphine from the reaction mixture.

9. Method of making tetra-lower alkyldiphosphines comprising reacting, at a temperature of about 60–210° C., a di-lower alkylhalophosphine with a metal selected from the group consisting of alkali metals, Cu, Fe, Zn, Al, Mg, and Pb in an aromatic hydrocarbon solvent, at least one mole of metal being present for each mole of di-lower alkylhalophosphine, and recovering a tetra-lower alkyldiphosphine from the reaction mixture.

10. Method of making tetra-lower alkyldiphosphines comprising reacting, at a temperature of about 60–120° C. a di-lower alkylhalophosphine with an alkali metal in an aromatic hydrocarbon solvent, at least one mole of metal being present for each mole of di-lower alkylhalophosphine, and recovering a tetra-lower alkyldiphosphine from the reaction mixture.

11. Method of making dialkylphosphines comprising reacting at an elevated temperature a tetraalkyldiphosphine with an alkali metal in an aromatic hydrocarbon solvent to form a dialkylphosphine metal compound, reacting said metal compound with a proton donor selected from the group consisting of lower aliphatic alcohols, organic acids and water, and recovering a dialkylphosphine from the reaction mixture.

12. Method of making di-lower alkylphosphines comprising reacting, at a temperature of 60–210° C., a tetra-lower alkyldiphosphine with an alkali metal in a aromatic hydrocarbon solvent to form a di-lower alkylphosphine metal compound, at least 2 moles of alkali metal being present for each mole of tetra-lower alkyldiphosphine, reacting said metal compound with a compound having the formula R′OH, wherein R′ is lower alkyl, and recovering a di-lower alkylphosphine from the reaction mixture by distillation.

13. Method of making di-lower alkylphosphine metal compounds comprising reacting, at a temperature of 60–210° C., a tetra-lower alkyldiphosphine with an alkali metal in an aromatic hydrocarbon solvent to form a di-lower alkylphosphine metal compound, at least 2 moles of alkali metal being present for each mole of tetra-lower alkyldiphosphine, and recovering said di-lower alkylphosphine metal compound from the reaction mixture.

14. Method according to claim 13 wherein said metal is potassium.

15. Method according to claim 13 wherein said metal is sodium.

16. Method according to claim 13 wherein said solvent is Decalin.

17. Method according to claim 13 wherein said solvent is xylene.

References Cited in the file of this patent

UNITED STATES PATENTS 2,866,824   Burg et al. _____ Dec. 30, 1958

OTHER REFERENCES

Kosolapoff: "Organophosphorus Compounds," John Wiley & Sons, Inc., New York, 1950, pages 15, 16, 27, 28.

UNITED STATES PATENT OFFICE
CERTIFICATION OF CORRECTION

Patent No. 2,959,621            November 8, 1960

Heinz Niebergall et al.

It is hereby certified that error appears in the above numbered patent requiring correction and that the said Letters Patent should read as corrected below.

Column 6, line 38, for "alkaline" read -- alkali --; line 68, for "a aromatic" read -- an aromatic --.

Signed and sealed this 25th day of April 1961.

(SEAL)
Attest:

ERNEST W. SWIDER
Attesting Officer

DAVID L. LADD
Commissioner of Patents